Oct. 1, 1974 D. R. BARTLEY Re. 28,180
METHOD OF MAKING A PNEUMATIC TIRE
Original Filed Nov. 29, 1969
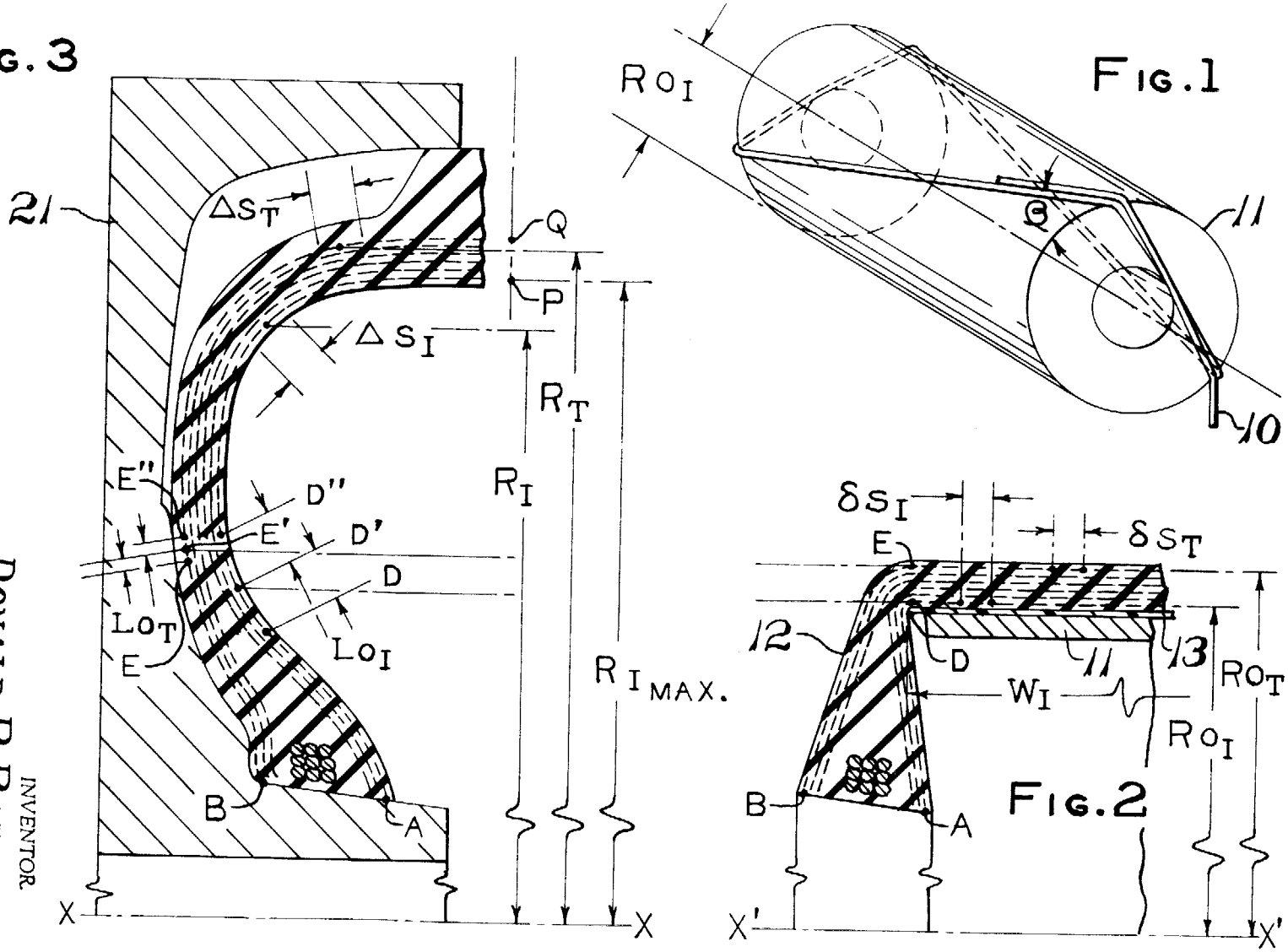
INVENTOR
DONALD R. BARTLEY
BY
W. A. Shira, Jr.
ATTY.

United States Patent Office

Re. 28,180
Reissued Oct. 1, 1974

28,180

METHOD OF MAKING A PNEUMATIC TIRE

Donald R. Bartley, Cuyahoga Falls, Ohio, assignor to The B. F. Goodrich Co., New York, N.Y.

Original No. 3,620,867, dated Nov. 16, 1971, Ser. No. 879,229, Nov. 24, 1969. Application for reissue Nov. 23, 1973, Ser. No. 418,754
Int. Cl. B29h *17/20*
U.S. Cl. 156—117 7 Claims

Matter enclosed in heavy brackets [ ] appears in the original patent but forms no part of this reissue specification; matter printed in italics indicates the additions made by reissue.

ABSTRACT OF THE DISCLOSURE

A method of making large, multiple ply, off-the-road, pneumatic tires by tape winding the carcass in a generally geodesic pattern over a cylindrical building drum. The angle of wrap with respect to the drum axis is maintained in any one ply of winding, but is increased incrementally from one ply to the next successive ply, thereby providing sufficient material in each ply to enable the carcass to be shaped to a toroidal tire with substantially balanced tension in the cords of adjacent plies.

BACKGROUND OF THE INVENTION

Pneumatic tires for earth moving and other off-the-road vehicles generally are of very large diameter and, because such tires generally support great vehicle loads, they must necessarily have a thick-walled carcass with mutliple plies of reinforced elastomeric material.

The fabrication of a tire having a thick-walled carcass by conventional tire building techniques has heretofore been quite costly. This is due, in part, to the fact that the lamination of the uncured, or green, carcass having multiple plies of reinforced elastomer from sheet fabric precludes rapid machine controlled building of the carcass on a drum. The time required to manually laminate the many plies on a building drum adds substantial labor costs to the tire and makes high volume production virtually impossible.

One method that has been tried for fabricating heavy multiple ply carcasses for off-the-road tires is that of winding the carcass from a tape of cord-reinforced elastomer. In this method, the tire is formed by winding the carcass in toroidal shape over a form by wrapping a continuous strip of cord reinforced uncured elastomer over a shaped core and then removing the core upon completion of the tape wrapping. This method of making a tire is generally unsatisfactory for volume production in view of the difficulty in removing the core from the completed tire.

In the conventional fabrication technique of manually laminating the carcass in flat band form on a building drum from plies of cord-reinforced fabric, the ends of the drum are undercut to permit the initially applied plies to be folded back under the ends of the drum. This permits the initial plies to be increased in axial width, thereby providing sufficient material to permit lifting and shaping of the carcass to the full toroidal tire configuration after removal from the building drum prior to vulcanizing. Because of the thickness of the carcass, there is a substantial difference in the edge-to-edge length as measured in any axial plane of the outer plies, as compared with the arc length of the initial plies as measured in any axial plane of the shaped carcass. As previously mentioned, in conventional laminated-ply fabrication, this problem of difference in length is overcome by folding the initial plies under the ends of the building drum during lamination of the carcass.

However, in attempting to continuously tape wind a multiple ply tire carcass rapidly on a cylindrical drum, it has been heretofore not possible to provide extra width to the initial plies. In order to fabricate a uniform carcass and fully realize one of the most significant advantages of tape winding, namely, substantially decreased carcass fabrication time, it is necessary to maintain the tape under tension during winding. When a green, or uncured, carcass is fabricated by continuously winding a tape under tension over a drum, the region wound over the drum ends cannot be folded under. Hence, the extra width of the inner plies, necessary for equal tension in the ends of the shaped tire, could not be provided. For this reason, the method of winding a tire carcass on a cylindrical drum from a continuous tape of cord-reinforced elastomer has been heretofore unusable for fabricating the thick, multiple-ply, carcasses required for heavy-duty off-the-road tires.

SUMMARY OF THE INVENTION

The present invention provides a novel method for rapidly tape-winding the thick wall, multiple-ply, carcass for an off-the-road tire in a manner which overcomes the above-described difficulties.

The unvulcanized carcass is wound in a generally geodesic pattern on a cylindrical building drum with the beads formed by integral portions of the tape being tangentially disposed relative to circles, one at each end region of the building drum, corresponding to the inner periphery of the beads of the tire.

It is necessary to provide greater width to the plies wound initially on the drum in order to compensate for the greater axial width of the terminally wound plies. In the present invention, during winding of the tapes on the building drum, the angle of tape wrap with respect to the plane at the drum ends is varied in equal increments between the initial ply and each successive ply to provide control of the amount of fabric in each ply in the direction axially of the drum, or width of the carcass. Thus, a provision for increasing the width of the initial plies is now available in the tape wound method equivalent to that which has been previously accomplished by folding ply stock under the drum edges in the conventional fabrication procedure using sheeted ply fabric. Therefore, when the carcass made in accordance with the method of the present invention is lifted and shaped, the proper amount of material is present in each ply to permit pantagraphing of the cords and provides substantially balanced tension in the cords of each ply.

BRIEF DESCRIPTION OF THE DRAWINGS

FIG. 1 is a schematic view of a cylindrical building drum with the beginning of a tape wound carcass;

FIG. 2 is a fragmented sectional view of a building drum with the completed carcass tape wound thereon prior to shaping and vulcanizing; and FIG. 3 is an axial quarter section of the completed tire after shaping in a mold.

DETAILED DESCRIPTION

In the presently preferred practice of the invention, the tire carcass is formed by winding a tape of elastomer coated cords over a cylindrical building drum in a substantially geodesic pattern. The beginning of such a winding is illustrated schematically in FIG. 1 and will be referred to in greater detail later in the description. The winding may be performed generally in the manner set forth in U.S. Pat. No. 3,112,234, or by any other convenient method for producing a generally geodesic winding pattern, but subject to the modifications as hereinafter described.

The tape of elastomer coated cords is wound over the drum in layers or plies of windings with the portions of the windings on the periphery of the drum making an angle, known as the "green" angle, with the end of the drum or plane perpendicular to the drum axis. The ply layers are usually formed by indexing the drum about its axis until the windings have formed a complete layer or ply. Alternatively, the drum may remain stationary and the windings effected by a means which carries the tape around the drum. Where multiple plies are required for high carcass strength, repeated winding of the tape around the drum provides the requisite superposed ply layers of cord reinforced elastomeric tapes.

Specifically, the uncured or green carcass 12 is made, in accordance with this invention, by winding a continuous tape 10 of elastomer covered cords over the drum 11 at a green angle $\beta$, with respect to the end of the drum which angle is substantially constant for each ply. The drum 11 may be of conventional design having the usual internal collapsing mechanism, which has been omitted in the drawings, for removal of the tire after the winding has been completed. Preferably, the drum is collapsed and the tire removed axially. An adhesion resistant release layer 13 is preferably applied over the drum prior to winding for providing easy release of the carcass from the drum. The release layer may be of any convenient thin sheet material but in the presently preferred practice, a thin film of plastic, for example, polyethylene, is used.

In order to wind a carcass 12 of multiple plies on the building drum 11, such that the carcass may be lifted with sufficient material in each ply of the carcass winding to enable proper shaping of the tire to the full toroidal configuration with equal tension in all cords, it is necessary to establish a correct axial width, or drum set, for the drum over which the carcass 12 is wound. This is determined for any desired "cured" angle, $\alpha$, of cords in the crown region of the vulcanized tire by a combination of graphical and algebraical operations. Briefly stated, this comprises first determining the arcuate length, in any axial plane, of the portion of the initial ply which was subject to pantographing when the tire is shaped from the position of the carcass on the drum 11 to the final toroidal configuration. This initial determination is made by measurement from a graphic layout of an axial cross section of the shaped tire in the mold. The corresponding axial length, of that portion of the initial ply, required to be wound on the building drum is then computed by trigometric computations based on the cured angle and lift ratio, or ratio of the radius of the expanded portion, to the radius of such portion as-wound on the drum. To this is added an appropriate amount of material for the regions where no pantographing occurs, and an additional appropriate amount to compensate for the elongation of the cords under tension, enabling the determination of the axial drum width, or drum set as it is commonly called, required for winding the initial ply with the proper axial width.

Referring now to FIGS. 2 and 3, the axial cross sections of the carcass, as-wound on the drum, and the tire as shaped in the mold, are shown aligned such that the axis of the drum X'—X' is coincident with the axis X—X of rotation of the tire, thereby enabling direct axial projection of points on the carcass when situated on the drum, as shown in FIG. 2, to corresponding points of the shaped tire in the mold, as shown in FIG. 3.

Referring now to the initial ply, the distance between the inner periphery of the bead and drum diameter at which the initial ply is wound, is shown in FIG. 2 as the distance between points A and D. The portion of the initial ply, indicated by the distance A–D of FIG. 2, is that portion which is initially wound over the ends of the drum 11 at right angles to the axis of the drum and is subject to a negligible amount of pantographing action when the carcass is lifted. This portion, although initially wound at right angles to the drum, is shown pulled axially inward slightly due to the pressure of the build-up of subsequently wound plies which cause the initially wound plies to shift to equalize the tension of winding in the various plies. A distance equal to the length A–D on the initial ply in FIG. 2, is scaled, or laid out, along the arcuate configuration of the initial ply on a drawing, made to scale, of the tire in the mold starting at the toe of the bead and proceeding radially outward in the shaped tire, as shown in FIG. 3. The axial edge of the initial ply as-wound over the diameter of the drum, denoted by point D in FIG. 2, is next projected axially on the configuration of the initial ply in the shaped tire, shown in FIG. 3 as point D'. The length along the arc of the initial ply, between the end of the arc length A–D and the projected point D', shown as distance D–D' in the shaped tire, illustrated in FIG. 3, is designated $L_{oI}$.

A distance equal to twice the length $L_{oI}$ is scaled along the arcuate length of initial ply on each sidewall in the shaped tire, in a direction radially outwardly beginning with the point D. This portion is shown as the arcuate length between points D and D'' in FIG. 3 and is assumed to be the amount of material required to provide for the region centered about the projected point D' in which the pantographing action of the cords is irregular and which region is known as the region of "cancelling lift" for each sidewall of the tire.

The remaining portion of the arcuate configuration of the initial ply is that portion lying radially outwardly of the regions of cancelling lift, and for each sidewall and one-half of the tread region, this portion, as shown in FIG. 3, is the length along the arc of the initial ply between points D'' and P. In order to determine the width of the drum and the angle of winding of the tape thereon to provide the length of this portion of the initial ply, namely D''–P, it is necessary to know the cured angle $\alpha$, which is the angle made by the cords of the tape with respect to a plane perpendicular to the axis of the shaped tire in the crown region where maximum carcass lifting occurs. The value of this angle $\alpha$ is, in accordance with known criteria, selected to provide the desired characteristics of the finished tire. Also, it is necessary to select a diameter for the drum over which the tape is to be wound. This is done in accordance with known requirements of tire bead diameter and desired lift ratio.

Having ascertained the desired cured angle $\alpha$ at the tire crown, the portion of the initial ply in the shaped tire, shown as D''–P, which is subject to pantographing action, is subdivided into increments of equal arcuate length in an axial plane, which increments are denoted by the length $\Delta S_I$ in FIG. 3. In the presently preferred practice of the invention, each half of the tire cross section has the arcuate length sub-divided into 3 or 4 increments. However, for greater accuracy, a larger number of increments may be used. The radius of the tire to the axial midpoint of the increment $\Delta S_I$ is measured from the layout of the tire in the mold, shown in FIG. 3 as $R_I$, for each of the increments $\Delta S_I$ it being understood that for purposes of drawing clarity, only one increment of arc length $\Delta S_I$ is shown in FIG. 3.

The corresponding increment of axial length of the drum to provide the increment $\Delta S_I$ of the shaped tire is then found. This is indicated in FIG. 2 as the increment [$\delta s_I$] $\delta S_I$. The radius of this increment for the initial ply on the drum, denoted by [$R_o$] $R_{oI}$ in FIG. 2, will remain constant during the remainder of the computations for each axial increment [$\delta s_I$] $\delta S_I$.

In order to make the determination of each [$\delta s_I$] $\delta S_I$, it is necessary to establish a value of the green angle, $\beta_I$, for the cords of the initial ply as wound on the drum. This is accomplished by measuring the maximum radius of the initial ply in the crown region of the shaped tire which occurs at the axial centerline of the tire, denoted by $R_I$ max., and employing that value in the well-known lift formula:

$$\cos \beta_I = \frac{[R_o]\ R_{o_I} \cos \alpha_I,}{R_{Imax.}}$$

[cos $\alpha_I$,] where $\alpha_I$ is the selected angle of the cords at the crown of the shaped tire and [$R_o$] $R_{o_I}$ is the radius of the drum. This computed value of green angle $\beta_I$ will then be assumed constant for the remainder of the computations for the initial ply.

The local value, $\alpha\Delta S_I$, of *the cured* cord angle in the shaped tire for each increment of arc length, such as $\Delta S_I$, is determined from the relationship.

$$\cos \beta_I = \frac{R_o]\ R_{oI}}{R_I} \cos [\alpha_I]\ \alpha\Delta S_I, \text{ [and]}$$

where [$R_o$] $R_{oI}$ is the drum radius, which remains constant and $R_I$ is the local value of the radius to the midpoint of each of the arc length increments $\Delta S_I$, as measured graphically from the layout of the tire in the mold as illustrated in FIG. 3.

Having determined the shaped or cured angle [$\alpha$] $\alpha\Delta S_I$ for each of the increments $\Delta S_I$, it is now possible to determine the length of the corresponding increments $\delta S_I$ of axial length of the drum. Thus, the increment of axial length $\delta S_I$ corresponding to the increment $\Delta S_I$ is determined from the expression:

$$\delta S_I = \Delta S_I \frac{\sin \beta_I}{\sin \alpha_I},$$

where the subscript I denotes the initial ply.

This procedure is then followed for all the increments of arc length $\Delta S$ in the one-half of the shaped tire as illustrated in FIG. 3. A summation of these values yields a value which is one-half the total axial length of carcass required to be wound on the drum to provide sufficient material for the region shown as arc length D″–P, in the initial ply that was subject to pantographing during lifting to form the shaped tire. It is then necessary to add sufficient material to this value to correspond to the arc length of the previously mentioned region of "cancelling lift" in order to complete the determination of one-half the axial width $W_I$ of the drum; that is, $\frac{1}{2} W_I = \Sigma\delta S_I + 2L_{oI}$, where $2L_{oI}$ is the length previously determined and is shown as the arc length D–D″ in FIG. 3. Additionally, $W_I$ may be increased by an amount to provide for stretch of the cords, this amount being approximately 2%.

In order to provide for the additional length of material required for the outer plies or layers of cords, the green angle $\beta_I$, as calculated, must be corrected. This correction is done by making a change $\Delta\beta$ in the green angle $\beta_I$ from the first determined value of $\beta_I$. The above-described procedure is repeated for calculating drum set, employing the radii and shaped cord angles of the terminal ply using the assumed change in green angle $\Delta\beta_I$ and the value [$\beta$T] $\beta_T = \beta_I$ [the] $+\Delta\beta$ for the green angle for the terminal ply.

The subscript T may be substituted for the subscript I in the above formulas to denote values of arc length, radius, cured tire angle and green angle as they are applied to the terminal ply.

Referring now to FIG. 2, the point E represents the axial edge at the diameter at which the terminal ply is wound on the drum and the point E′ in FIG. 3 denotes the axial projection of point E in FIG. 2 onto the configuration of the terminal ply in the shaped tire shown in FIG. 3. The distance B–E in FIG. 2 represents the length of the portion of the ply overlapping the ends of the drum. This radial ply length, B–E of FIG. 2, is then scaled along the terminal ply configuration in the completed tire, as shown in FIG. 3, starting from the bead and proceeding along the ply configuration in a radially outward direction, the said distance B–E, shown as the distance between points B and E of FIG. 3. Thus, the distance between points E and E′ of FIG. 3, along the terminal ply, denoted by $L_{oI}$ in FIG. 3, represents the distance between the axial projection of the edge of the terminal ply, as-wound on the drum, and the actual radial ply length scaled along the ply in its lifted configuration and the said distance is also equal to one-half of the portion known as the region of "cancelling lift" for one sidewall of the terminal ply as explained previously for the initial ply. Thus, the distance E′–E″ in FIG. 3 represents the amount of additional ply material added to complete the region of cancelling lift for one sidewall of the terminal ply, which portion is also equal to $L_{oT}$, such that the region of cancelling lift for one sidewall comprises the length E–E″ and is equal to $2L_{oT}$.

The remaining portion of the terminal ply, radially outward of the region of cancelling lift, is that portion which is subject to pantographing action when the carcass is lifted from the drum 11 and shaped into the mold 21. One-half of this pantographed portion is denoted by the arc length from the region of cancelling lift to the crown center of the tread, shown as the length between points E″ and Q of FIG. 3, it being understood that an identical symmetric half is present along the opposite sidewall of the tire which is not shown in the partial sectional view of FIG. 3. The portion of the terminal ply radially outward of the region of cancelling lift, denoted by E″–Q, in FIG. 3, is subdivided into equal increments, denoted in FIG. 3 by $\Delta S_T$. The radius [$R_{1T}$] $R_T$ of each increment $\Delta S_T$ is measured from the tire axis to the midpoint thereof. The corresponding increment of axial length of the drum, denoted in FIG. 2 as $\delta S_T$, has a radius, denoted by $R_{oT}$ in FIG. 2, which is constant.

Following the same procedure as that used for determining the drum set $W_I$ for the initial ply, the drum set for the terminal ply, denoted by $W_T$, is determined from the expression $\frac{1}{2} W_T = \Sigma\delta S_T + 2L_{oT}$.

If the change $\Delta\beta$ in the green angle has been properly chosen, the drum set $W_T$ for the terminal ply is equal to the drum set for the initial ply. If the values of drum set are not the same, a new angle $\beta_T$ is assumed and the value of drum set is recomputed. Since $\Delta\beta$, as finally determined, represents the total change in the green angle from that used for winding of the initial ply to that used for winding the terminal ply, it is then necessary to apportion the change $\Delta\beta$ between the intermediate plies. This is done by dividing $\Delta\beta$ into equal sub-increments wherein the green angle is changed by such an equal sub-increment between the windings of each successive intermediate ply, until the value $\beta_I + \Delta\beta = \beta_T$ is obtained for the winding of the terminal ply.

In the presently preferred practice of the invention, the change in the green angle $\Delta\beta$ is initially assumed as usually an amount in the range between 2° to 4° from the initial to the terminal ply and the difference between successive plies is preferably from $\frac{1}{10}$°–½°. However, the assumed value is, of course, an estimate, the closeness of which to the final value will be determined by some experience with the range that can be expected.

The present invention thus provides a unique method for tape winding the carcass of a multiple ply tire of the type used for off-the-road vehicles enabling such a carcass to be made with a speed heretofore unobtainable. The problem of providing the necessary amount of material in each ply of the carcass, such that the uncured carcass may be wound in flat band form on a building drum and lifted to full toroidal shape with the cords in each ply positioned so as to provide substantially balanced tension in the plies upon inflation of the completed tire, is solved by changing the angle of winding an amount between each successive ply determined in accordance with the method of the invention.

Modifications and adaptations of the present invention may be made by [thus] *those* having ordinary skill in the art, the invention being limited only by the spirit and scope of the appended claims.

I claim:

1. In the method of making a pneumatic tire having a carcass of multiple plies of cord reinforced elastomer, the steps comprising:

(a) providing a tape of elastomer covered reinforcing cords;

(b) selecting the desired cured angle of the cords in the crown region of said tire;

(c) providing a cylindrical building drum having a preselected diameter intermediate that of the bead and crown of the tire to be formed;

(d) determining the axial width of the said drum from measurements taken from a layout of the configuration of the vulcanized tire in a mold;

(e) winding continuously a layer of said tape over said drum in a substantially geodesic pattern of circumferentially indexed windings with each winding making a substantially constant angle with a plane normal to the drum axis with portions of the windings extending over the ends of the drum and tangentially of a central circular region defining the beads of said tire; and (f) winding additional layers of said tape upon said drum with the windings in each successive layer making a substantially constant but incrementally larger angle in the range $\frac{1}{10}°$–$\frac{1}{2}°$ with said plane than the windings in the previous ply thereby forming a tire carcass.

2. The method defined in claim 1, further comprising:

(a) applying uncured elastomer on the carcass for forming the tire tread;

(b) removing the carcass from the drum;

(c) expanding the carcass to generally toroidal configuration; and, (d) vulcanizing the carcass in a mold to form a completed tire.

3. The method defined in claim 1, wherein the difference between the angle of winding in the initial ply and the angle of winding in the terminal ply is apportioned in equal increments for the windings in each successive intermediate ply.

4. In the method of making the carcass of a generally toroidally shaped pneumatic tire by winding a plurality of layers of tape comprising elastomer covered cords on a cylindrical drum, the steps comprising (a) selecting a cylindrical drum having a diameter intermediate the bead and crown diameters of the shaped tire and an axial length determined by:

(1) selecting a value of the cured angle for the cords in the initial layer thereof in the crown region of the shaped tire;

(2) computing the green cord angle for the initial layer from the value of the said selected cured angle and the lift ratio;

(3) sub-dividing, on a model made to scale of the shaped carcass, the curvilinear portion thereof subject to pantographing upon being shaped to toroidal configuration, into increments of equal length and measuring the radius from the tire axis to the axial midpoint of each of said increments;

(4) employing the said green angle, each incremental length and the radius thereof to compute the increment of axial length, of the initial layer required to be wound on the drum for each of said increments of curvilinear length;

(5) determining by measurement on said scale model, the distance on said initial layer extending from the region of the tire radially outwardly from a bead to the said portion subject to pantographing and subtracting therefrom the amount by which the cords of said inner layer will project radially inwardly of the drum, [doubling the sum resulting from steps (4) and (5) to provide a first determination of drum length,]

(6) [determining the axial length of the drum required to wind the initial ply] *providing a first determination of drum length* by doubling the value resulting from a summation of the increments determined in step (4) and the addition thereto of the amount determined in step (5), (7) [selecting] *estimating* a value of green angle for the cords in the outer layer of the carcass and repeating the procedures of steps (3)–(6) inclusive using the last-mentioned green angle, thereby determining [the] *an estimated* axial length of the drum, for the outer layer, (8) comparing the two thus determined values for the axial length of the drum;

(9) adjusting the said [selected] *estimated* value of green angle for the outer layer from the value selected in step (7), and recomputing the axial length of the drum until the value determined therefor is equal to the value determined for the initial layer thereby establishing the actual length of the drum; and, (b) winding a plurality of circumferential excursions of the tape upon the drum so selected in a plurality of layers with the cords in the initial layer making an angle to the end face of the drum as determined in step (2), the angle of the cords in the outer layer equal to the final value determined in step (9) and the angles of the cords in the intermediate layers varying by equal increments from the angles of the cords in said initial and outer layers.

5. The method defined in claim 4, wherein the said adjustment of the selected value of the green angle for the outer layer is an increase in the range 2°–4° from the value of the green angle of the initial layer.

6. The method as defined in claim 4 further comprising the addition to the determined value for the drum length for the initial layer of an amount to compensate for the stretch of the cords.

7. The method as defined in claim 6, wherein the said amount to compensate for stretch of the cords is substantially 2% of the value determined for the initial layer.

References Cited

The following references, cited by the Examiner, are of record in the patented file of this patent or the original patent.

UNITED STATES PATENTS 2,352,055 6/1944 Witt ---------- 156—397

CLIFTON B. COSBY, Primary Examiner

U.S. Cl. X.R.

156—175, 397